United States Patent [19]
Toyota

[11] Patent Number: 6,035,719
[45] Date of Patent: Mar. 14, 2000

[54] NOISE/VIBRATION MEASURING AND DISCLOSING SYSTEM

[75] Inventor: Katsunori Toyota, Tokyo, Japan

[73] Assignee: Kabushiki Kaisha Alpha Tsushin, Tokyo, Japan

[21] Appl. No.: 09/129,595

[22] Filed: Aug. 5, 1998

[51] Int. Cl.[7] .................................................. G01H 11/00
[52] U.S. Cl. ............................................. 73/649; 73/658
[58] Field of Search ............................. 73/649, 654, 658, 73/659, 661, 662, 655, 577, 579, 584, 585, 591, 592, 594, 595; 702/35, 39, 57; 367/38, 142, 149

[56] References Cited

U.S. PATENT DOCUMENTS 5,265,831  11/1993  Muller ...................................... 246/124
5,721,710   2/1998  Sallas et al. ............................... 367/41

FOREIGN PATENT DOCUMENTS 61-175528  8/1986  Japan .
 9-210761  8/1997  Japan .

*Primary Examiner*—Hezron Williams
*Assistant Examiner*—Helen C. Kwok
*Attorney, Agent, or Firm*—Skjerven, Morrill, MacPherson, Franklin, & Friel LLP

[57] ABSTRACT

A noise/vibration measuring and disclosing system, comprises: a detecting unit for detecting noise/vibration generated from a work site; a display unit for displaying a measured value of noise/vibration detected by the noise/vibration detecting unit; and a control unit for controlling the detecting unit and the display unit. The noise/vibration display unit is placed at a location visible from outside the premises of the work site so that the measured values of noise and vibration can be effectively disclosed to the local residents.

22 Claims, 10 Drawing Sheets

Fig. 2
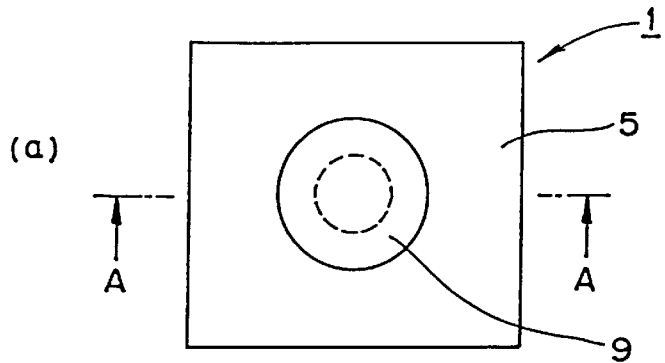
(a)
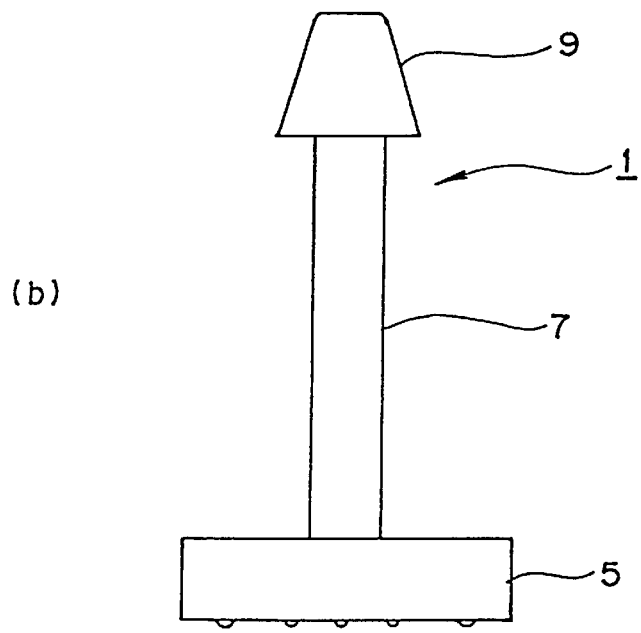
(b)
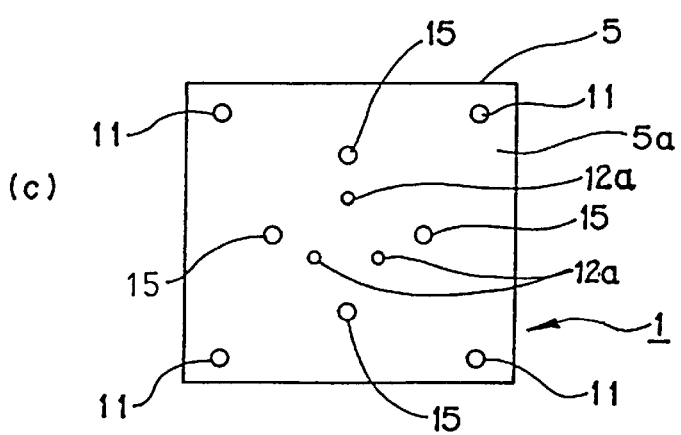
(c)

Fig. 8
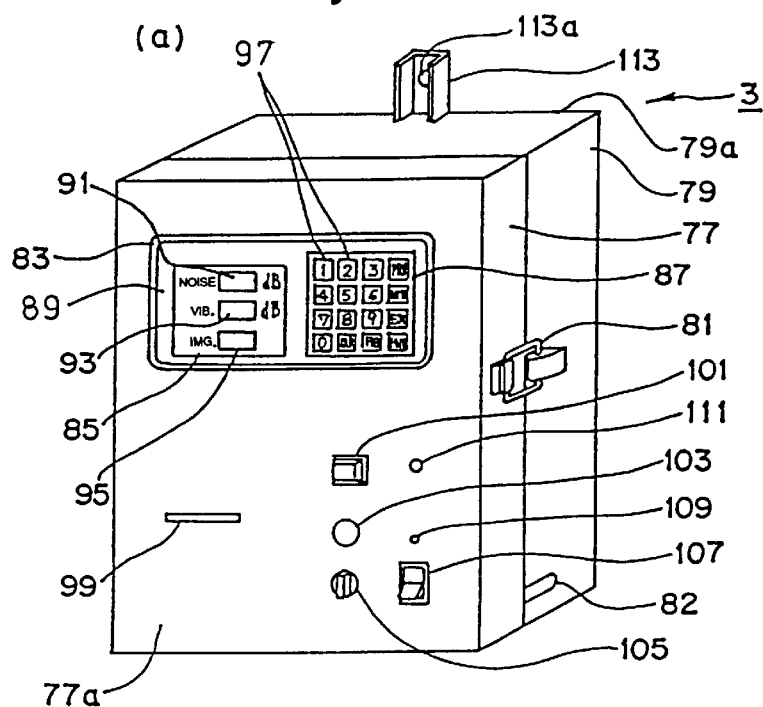
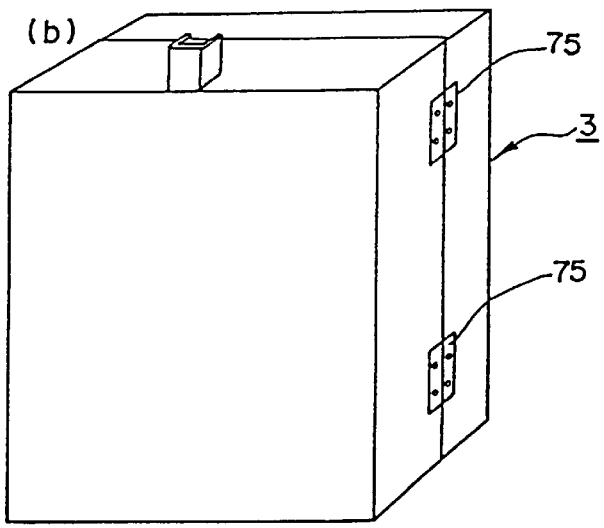
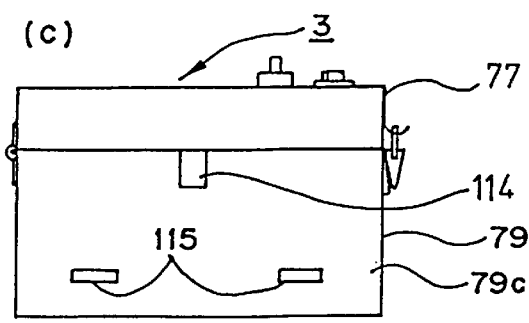

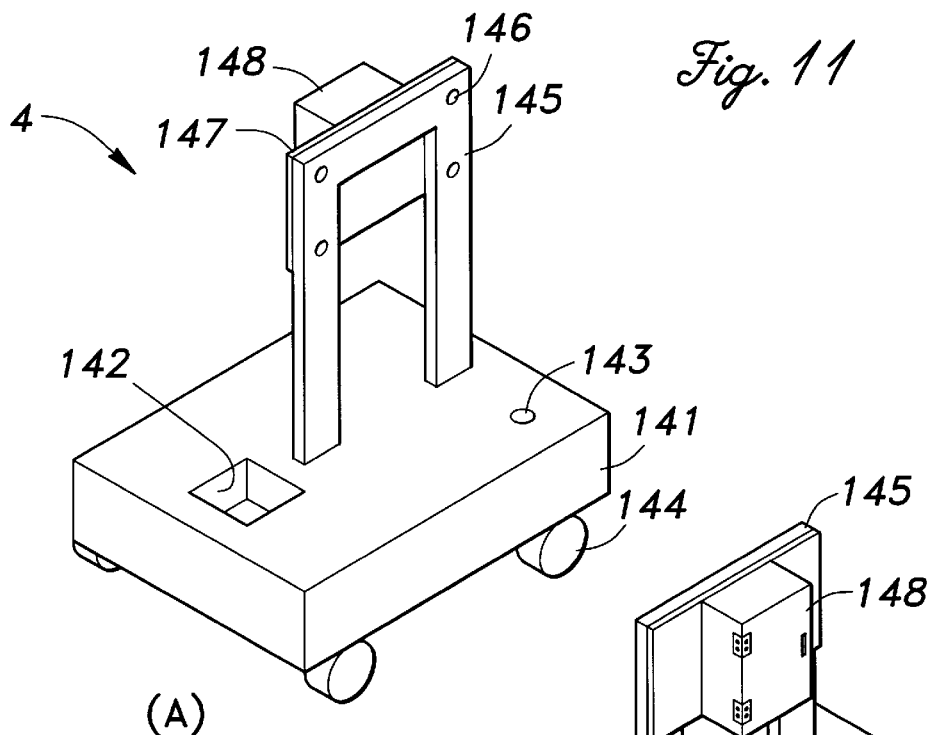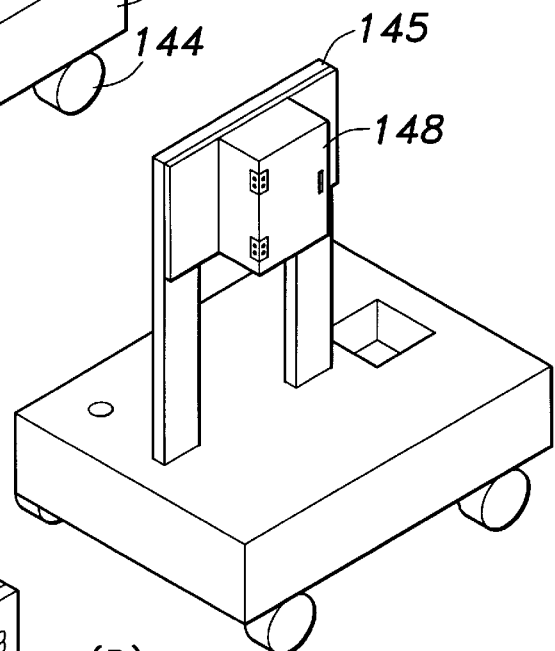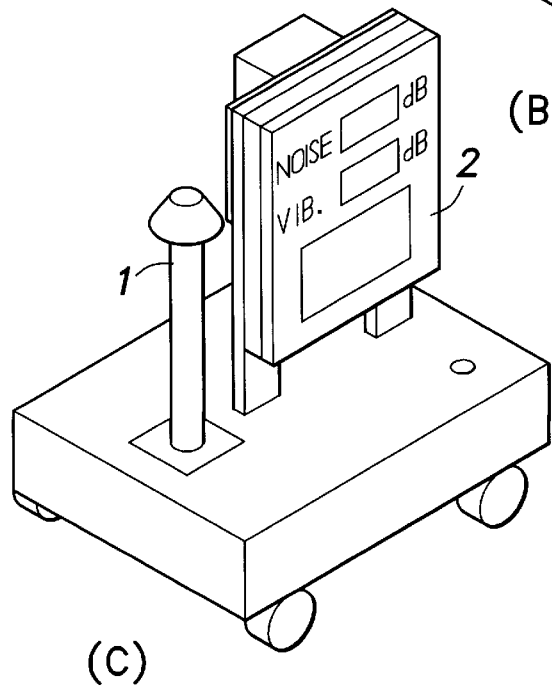
Fig. 11

NOISE/VIBRATION MEASURING AND DISCLOSING SYSTEM

TECHNICAL FIELD

The present invention relates to a system for measuring noise and/or vibration generated at a work site such as a construction site, a factory or the like and at the same time disclosing the measured data to the local residents so that a favorable relationship between the local residents and the company can be established.

BACKGROUND OF THE INVENTION

Generally, the level of noise and vibration generated at a construction site or a factory must meet the regulations or the law to ensure a quality of life of the local residents. However, complaints from the local residents about the noise and vibration generated at a construction site are often heard even when the regulations are fully met.

In the past, the levels of noise and vibration were customarily measured and monitored by the company so that they could be proved to meet the regulations. However, it was typical that the local residents could not easily make an access to the measured data and therefore could not check by themselves whether or not the construction was carried out under the regulations. It was often the case that the local residents could check the measured data only after a report was prepared by the company. Thus, the disclosure of information to the local residents was not satisfactory, particularly in view of quick or real-time disclosure of the measured data. This often led to an unfavorable relationship between the company and the local residents.

BRIEF SUMMARY OF THE INVENTION

As used throughout herein and in the appended claims, the term "noise/vibration" is defined to mean "noise, vibration, or both noise and vibration." The present invention is designed to solve such prior art noise/vibration problems, and therefore it is a primary object of the present invention to provide a noise/vibration measuring and disclosing system which can disclose measured data of noise/vibration generated at a construction site or the like quickly and effectively to the local residents so that the system can contribute to establishing a favorable relationship between the local residents and the company carrying out construction or the like.

According to the present invention, the object can be achieved by providing a noise/vibration measuring and disclosing system, comprising: means for detecting noise/vibration; means for displaying a measured value of noise/vibration detected by the noise/vibration detecting means; and means for controlling the detecting means and the display means.

Thus, by placing the noise/vibration display means at a location easily visible by the local residents, the local residents can check the noise/vibration generated from the construction site or the like at any time. This can help the local residents to understand that suitable measures are taken by the company to control noise/vibration, and thereby contribute to establishing a favorable relationship between the company and the local residents.

Preferably, the noise/vibration detecting means is incorporated in a detecting unit, the noise/vibration display means is incorporated in a display unit and the control means is incorporated in a control unit, the three units being separate from each other.

In this way, the detecting unit, the display unit, and the control unit can be placed at different locations from each other. Thus, it is possible, for example, to place the detecting unit inside the construction site while placing the display unit at a location visible from outside the premises of the construction site so that the local residents can check at any time whether or not the noise/vibration inside the construction site are controlled under the regulations.

In one embodiment of the present invention the system further comprises a base unit for combining the detecting unit, the display unit and the control unit. This embodiment is preferable when the location where the measurement is carried out is the same as or very close to the location where the measured data should be disclosed, such as when the system is used on a road which is under construction for cable laying or the like.

The base unit preferably comprises: a base portion comprising a hollow member adapted for steadily holding the detecting unit thereon; and a supporting portion provided on the base portion for supporting the detecting unit and the display unit; wherein the hollow base portion is adapted such that liquid material can be filled into and discharged from the base portion to change a weight of the base unit. When the system is in use, the base portion is filled with water or the like so as to stabilize the system. The water filling the base portion can be discharged when the system is required to be transported to another place. Thus, the system can be transported to various locations easily and disclose the measured data then and there. It will be preferable if the supporting portion comprises a container for accommodating the control unit so that rain water can be prevented from reaching the control unit when the system is used outdoors.

It is preferable if the control unit is provided with: means for comparing a measured value of noise/vibration with a predetermined noise/vibration reference value so as to generate an alarm signal when the measured value of noise/vibration exceeds the reference value; alarming means for emitting an alarm in response to the alarm signal generated by the comparison means; and reference value setting means for setting the noise/vibration reference value.

Since the alarming means for emitting an alarm when the measured value of noise/vibration exceeds the reference value is provided to the control unit, such excess of measured value can be noticed immediately, and therefore monitoring of noise/vibration can be facilitated. If the control unit is placed in the construction site office or the like, the company can promptly deal with such excess of noise/vibration. By using the reference value setting means, the reference value for noise/vibration can be changed depending on local conditions or restrictions.

It will be more preferable if the display unit further comprises image display means for displaying an image, and the control unit further comprises image selection means for selecting the image displayed on the image display means.

The image display means provided to the display unit can display various information regarding the construction or the like besides the measured values of noise/vibration; for example, the construction company's name, construction site address and telephone number, construction site manager's name, messages from the company, etc. as well as picture information. Such information can promote establishing a favorable relationship between the local residents and the company. The images displayed on the image display means can be properly selected by using the image selection means.

The control unit may preferably comprise: second noise/vibration display means for displaying a measured value of noise/vibration; and displayed image verification means for verifying the image displayed on the image display means.

The second noise/vibration display means provided to the control unit enables a personnel near the control unit to check real-time values of noise/vibration. The displayed image verification means provided to the control unit allows a personnel to check an image currently displayed on the image display means of the display unit without going to the location where the display unit is placed.

It is preferable if the control unit further comprises monitoring mode switching means for switching a monitoring mode of the system between a first monitoring mode in which the monitoring of noise/vibration starts and stops automatically and a second monitoring mode in which the monitoring of noise/vibration starts and stops upon request.

When the first monitoring mode is selected, the monitoring of noise/vibration starts and stops automatically so as to prevent failure to start or stop the monitoring. When the system is in the second monitoring mode, the monitoring of noise/vibration can be conducted at any time upon request.

In a preferred embodiment of the present invention, the display unit and the control unit are connected to each other by communication means for allowing communication between a person at the display unit and a person at the control unit. In this way, through the communication means a local resident can directly communicate with a personnel in charge of the construction or other personnel at the control unit which is typically placed inside the construction site office. Thus, the local residents can deliver their complaints or inquiries to the company at any time, and the company can deal with the complaints or inquiries promptly.

Typically, the communication means is an intercom system and the display unit is provided with an intercom sub-station and the control unit is provided with an intercom master-station. The intercom sub-station can be easily incorporated in the display unit and can be readily replaced when it malfunctions.

In another preferred embodiment of the present invention, the control unit is provided with an expansion terminal for connection with an existing telephone line and the display unit is provided with an intercom sub-station which is connected to the existing telephone line via the expansion terminal of the control unit. In this way, an extension connected to the existing telephone line inside the construction site can be used in responding to a call from the intercom sub-station of the display unit. Therefore, a personnel in charge of the monitoring of noise and vibration need not be near the control unit to respond to the call from a local resident, and thus a wider range of activity of the personnel is achieved.

It is also possible that the display unit is provided with an intercom sub-station, and the control unit is provided with an intercom master-station and an expansion terminal for connection with an existing telephone line, so that the intercom sub-station is selectively connected under the control of the control means to either of the intercom master-station or the existing telephone line via the expansion terminal.

The control unit may be provided with an expansion terminal for connection with an outside communication network. The outside communication network may be a telephone line or a local area network, or may consist of a single personal computer. In this way, the system can send and receive information to and from the outside communication network via the expansion terminal.

The alarm signal generated by the comparison means can be transferred to external alarm emitting means via the expansion terminal. The external alarm emitting means may be for example a red flashing lamp such as that mounted to a patrol car. When the existing telephone line is connected to the expansion terminal, a beeper, a cellular phone or the like can also be used as the external alarm emitting means.

The system can comprise a plurality of said display units which are controlled by the control unit.

The plurality of display units facilitate the access of the data by the local residents and thereby contribute to more effective disclosure of the measured data so as to promote establishing a favorable relationship between the company and the local residents.

In a preferred embodiment of the detecting unit, the detecting unit comprises: (A) a vibration detecting means support which is adapted for being placed on a ground at which the measurement of vibration is performed, the vibration detecting means support comprising a hollow parallelepiped having a substantially square top and bottom, wherein the vibration detecting means is secured on an upper surface of the bottom of the vibration detecting means support in such a manner that a vibration detecting part having a rounded end extends through the bottom of the vibration detecting means support and projects from an under surface of the bottom of the support, and wherein support legs each of which has a rounded end and has substantially the same height as the end portion of the vibration detecting part are provided on the under surface of the bottom of the support; (B) a noise detecting means support comprising: a substantially cylindrical member standing upright on a central portion of the top of the vibration detecting means support so that an inner space of the substantially cylindrical member is connected to an inner space of the hollow vibration detecting means support via an opening formed at the central portion of the top of the vibration detecting means support; a noise detecting means mount fixed at a top portion of the substantially cylindrical member for securing a non-directional microphone serving as the noise detecting means in such a manner that a noise detecting part of the microphone is positioned above an upper end of the substantially cylindrical member; and a substantially spherical wind-shielding member for covering the noise detecting part of the microphone; and (C) a water guard member having a top wall and a diverging cylindrical side wall which extends from the top wall, inner surface of the side wall of the water guard attached to an upper part of the noise detecting means mount via a water guard member supporting arm extending therebetween so that the noise detecting part and the wind-shielding member are covered by the water guard member.

Since the end portion of the vibration detecting part and the support legs have substantially the same height, the amount of vibration transmitted to the vibration detecting means other than through the detecting part can be reduced and therefore accurate detection of the vibration can be achieved. The wind-shielding member covering the noise detecting part of the microphone can reduce the influence of wind on the microphone to thereby allow more accurate detection of noise. The water guard member substantially accommodates the noise detecting part and the wind-shielding member in a hollow thereof so as to prevent rain water or the like from reaching the noise detecting part of the microphone. This can effectively reduce the probability of malfunction of the microphone or other electric components, achieving a substantially maintenance-free system. Thus, the detecting unit can be placed at various locations including outdoors without the need for an additional device serving as a shelter.

In a preferred embodiment of the display unit, the display unit is provided on its front surface with: a noise display panel comprising LEDs for displaying a measured value of noise; a vibration display panel comprising LEDs for displaying a measured value of vibration; and an image display panel comprising LEDs for displaying the image selected by the image selection means of the control unit. More preferably, the display unit is further provided on its rear surface with engagement part for engaging the display unit to an engagement member fixed on a wall. The engagement part allows the display unit to be hung on the wall such as a noise-insulating wall surrounding the construction site, and thereby reduces a space required for its installation.

The control unit is preferably provided with a printer for printing the measured data of noise/vibration. In a preferred embodiment of the control unit, the control unit is provided on its front surface with: a displayed image verification panel comprising LEDs for displaying a code corresponding to an image displayed on the image display means, the displayed image verification panel serving as the displayed image verification means; a second noise display panel comprising LEDs for displaying a measured value of noise; a second vibration display panel comprising LEDs for displaying a measured value of vibration; an alarm buzzer and an alarm lamp serving as the alarming means; and a keypad serving as the reference value set means, the image selection means and the monitoring mode selection means; and the control means, the comparison means and the printer are mounted inside the control unit, and the control unit is further provided on its rear surface with engagement part for engaging the control unit with an engagement member fixed on a wall. The engagement part allows the control unit to be hung on a wall such as a wall of the construction site office, and therefore reduces a space required for its installation.

According to another aspect of the present invention, there is provided a data measuring and disclosing system, comprising: a detecting unit for detecting a parameter used in evaluating an influence of a work on an environmental condition; a display unit for displaying information regarding the work, the information including a measured value of the parameter; and a control unit for controlling the detecting unit and the display unit; wherein the detecting unit, the display unit and the control unit are separate from each other. The parameter may be air pollution level, water pollution level, radioactivity level, for example, although it is not limited to them.

BRIEF DESCRIPTION OF THE DRAWINGS

Now the present invention is described in the following with reference to the appended drawings, in which:

FIGS. 2(a)–(c) are a top view, a front view and a bottom view, respectively, of a detecting unit in the first embodiment of the present invention;

FIGS. 8(a)–(c) are a front perspective view, a rear perspective view and a bottom view, respectively, of the control unit shown in FIG. 1;

FIGS. 11(A) and (B) are a front perspective view and rear perspective view, respectively, of a base unit, and FIG. 11(C) shows the system with the detecting unit, display unit and control unit attached to the base unit.

DETAILED DESCRIPTION OF THE PREFERRED EMBODIMENTS
(FIRST EMBODIMENT)

Figure 1:
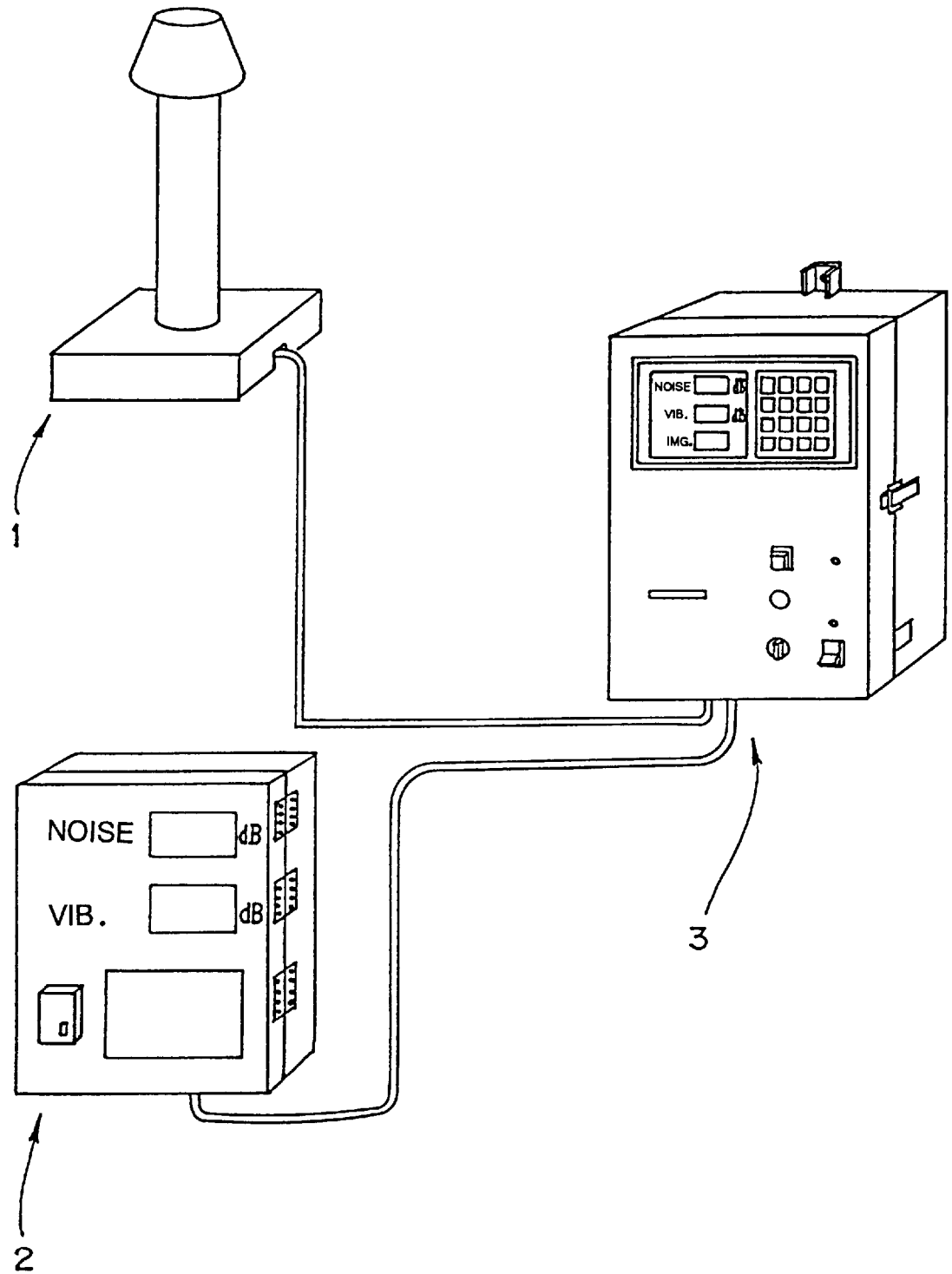
FIG. 1 shows a general configuration of the system according to a first embodiment of the present invention.

FIG. 1 shows an overall configuration of one embodiment of a noise/vibration measuring and disclosing system according to the present invention. This system comprises a detecting unit 1, a display unit 2, and a control unit 3 which will be described in detail in the following with respect to their concrete embodiments.

[DETECTING UNIT]

FIG. 2 shows an embodiment of the detecting unit 1 of the noise/vibration measuring and disclosing system according to the present invention. This detecting unit 1 may be positioned at various locations, which are determined according to the regulations or an agreement between the company and the local residents, so as to detect noise and vibration at such locations.

Figure 3:
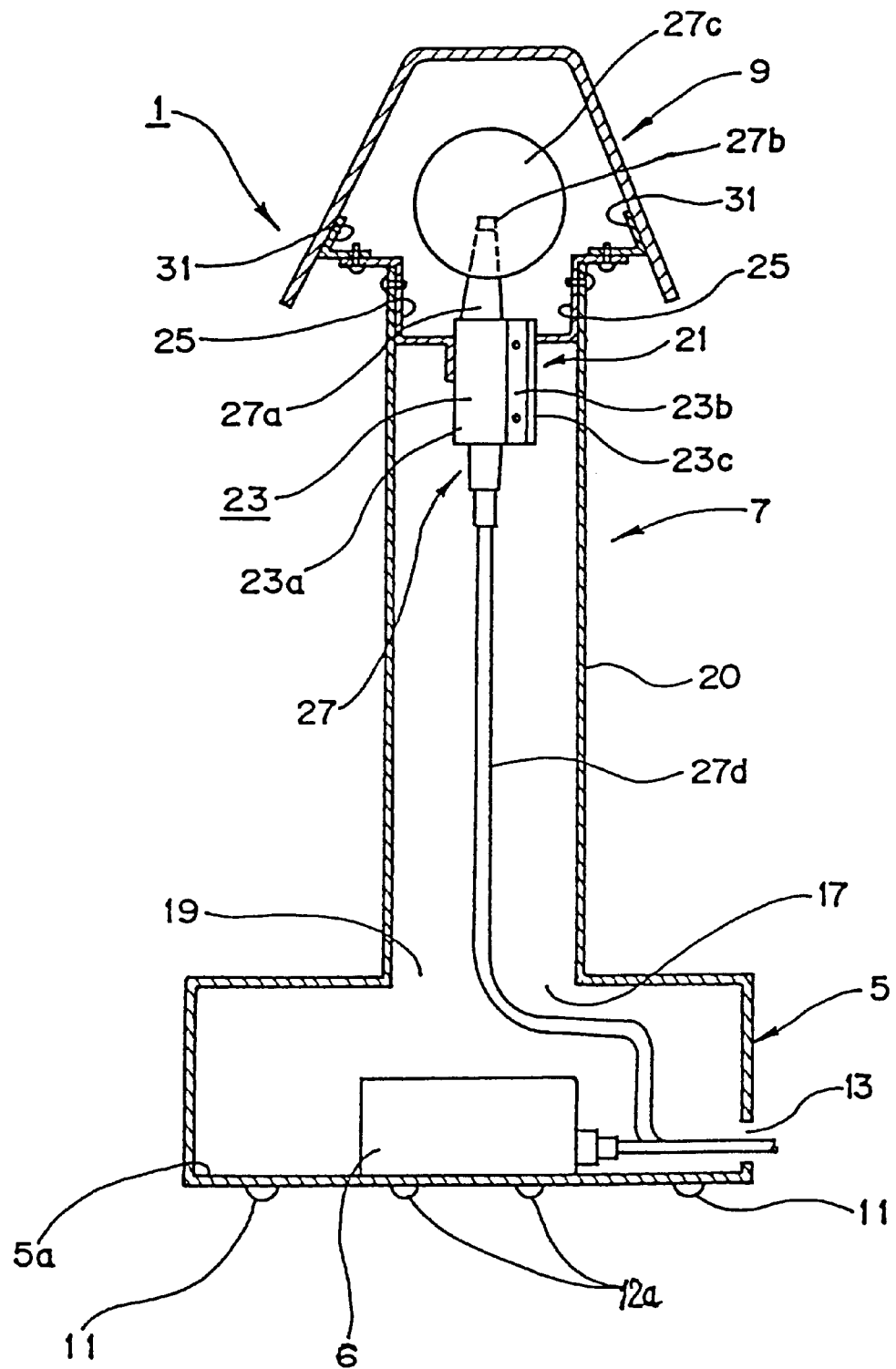
FIG. 3 is a cross sectional view of the detecting unit shown in FIG. 2 taken along the line A—A in FIG. 2(a)

FIG. 3 is a cross sectional view taken along the line A—A in FIG. 2.

A numeral reference 5 denotes a vibration detector support consisting of a hollow parallelepiped which has substantially square top and bottom. On an upper surface of the bottom plate 5a of the support 5 at a substantially central part thereof is secured a vibration detector 6 by means of screws 12. A rounded end portion 12a of each screw 12 which projects downwardly from the bottom plate 5a is brought into contact with the ground or inserted into the ground in the operable state, and functions as a vibration detecting part to transmit vibration from the ground to the vibration detector 6. At the four corners of the bottom plate 5a are provided support legs 11 each of which has a rounded end and has substantially the same height as the end portions 12a of the screws 12. This can reduce the amount of vibration transmitted to the vibration detector 6 other than through the end portions 12a and thereby allows accurate detection of the vibration. The vibration detector 6 is made as a unit component so as to prevent water/dust from entering it. On one side of the vibration detector support 5 is formed a hole 13 through which cables are drawn to the outside. Holes 15 in the bottom plate 5a are provided for drainage. The vibration detector 6 may be any conventional vibration detector of a suitable type including those utilizing a piezoelectric element, a light beam, or others in sensing vibration.

A noise detector support 7 mainly consists of a tubular member 20 which stands upright on the vibration detector support 5 and is welded to the same. The noise detector support 7 has a lower opening 19 aligned with an opening 17 formed in the upper plate of the vibration detector support 5.

Figure 4:
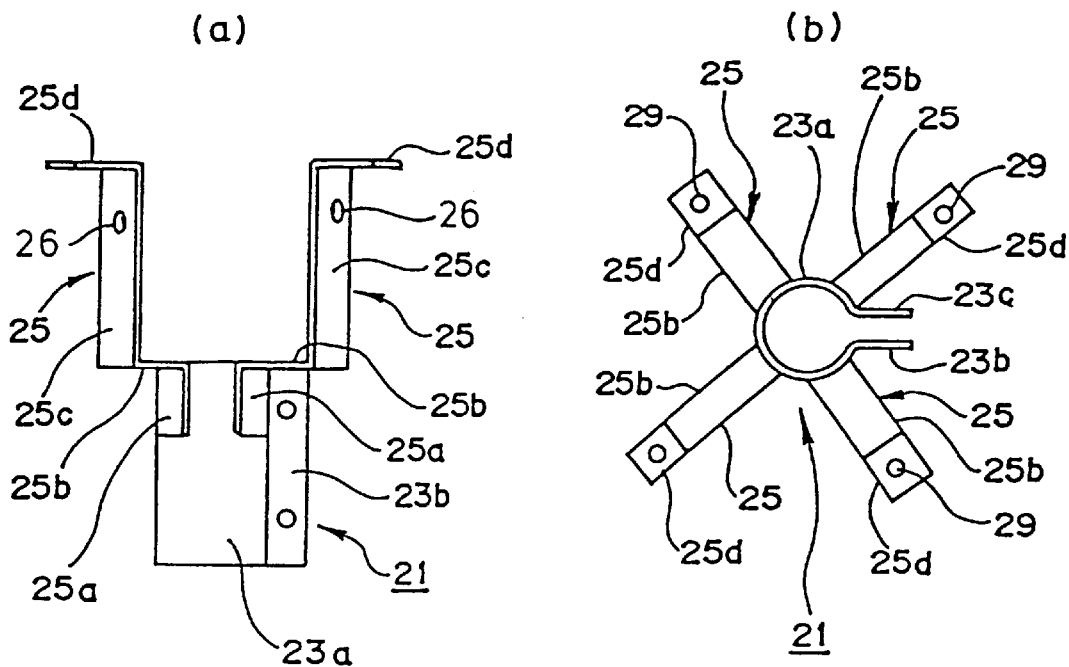
FIGS. 4(a) and (b) are a side view and a top view, respectively, of a noise detector support in the detecting unit shown in FIG. 3.

In an upper portion of the tubular member 20 is supported a noise detector mount 21 which is shown more in detail in FIG. 4, where FIG. 4(a) is a side view and FIG. 4(b) is a top view of the mount 21. The noise detector mount 21 comprises a substantially cylindrical gripping member 23 and four supporting arms 25 for attaching the gripping member 23 to an inner surface of the tubular member 20.

The gripping member 23 comprises a semi-tubular part 23a having opposing longitudinal ends from which two projecting parts 23b, 23c extend in a substantially radially outward direction. The noise detector such as a microphone 27 is inserted into the semi-tubular part 23a and secured in it by urging the projecting parts 23b, 23c toward each other by means of bolts and nuts for example. Preferably a cushioning material is attached to the inner surface of the semi-tubular part 23a.

Each supporting arm 25 is formed by bending a plate material. Specifically each supporting arm 25 comprises a first vertical portion 25a welded to an outer surface of the semi-tubular part 23a, a first horizontal portion 25b extending from an upper end of the first vertical portion 25a to the inner surface of the tubular member 20 in a radially outward direction, a second vertical portion 25c extending along the inner surface of the tubular member 20 to an upper axial end of the same, and a second horizontal portion 25d extending from an upper end of the second vertical portion 25c in the radially outward direction. A hole 26 is formed in each second vertical portion 25c to secure the second vertical portion 25c to the tubular member 20 by means of a bolt or the like.

Figure 5:
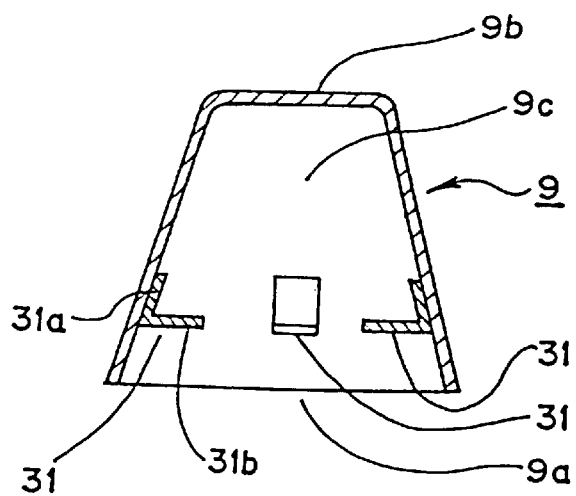
FIG. 5 is a cross sectional view of a water guard shown in FIG. 3.

A water guard 9 is disposed at the top of the detecting unit 1. The water guard 9 generally has an inverted cup-like shape as shown in FIG. 5. The water guard 9 comprises a top wall 9b and a diverging cylindrical side wall which extends from the top wall 9b and defines an opening 9a at an underside of the water guard 9. On lower parts of the inner surface of the side wall of the water guard 9 are welded four substantially "L"-shaped pieces 31 for supporting the water guard 9. More specifically each "L"-shaped piece 31 has a substantially vertically extending portion 31a welded to the inner surface of the side wall and an inwardly extending portion 31b adapted so as to be vertically aligned with the second horizontal portion 25d of a corresponding supporting arm 25. By attaching the inwardly extending portions 31b of the "L"-shaped pieces to the corresponding second horizontal portions 25d by means of bolts or the like, the water guard 9 is secured to the noise detector mount 21.

In this embodiment, the vibration detector support 5, the noise detector support 7 and the water guard 9 are formed of stainless steel and therefore sufficiently durable for the use outdoors.

A non-directional microphone 27 is used as a noise detector in this embodiment. As shown in FIG. 3, in the installed state a body part 27a of the microphone 27 is held within the tubular member 20, while a noise detecting part 27b of the microphone 27 projects into a cavity 9c defined by the water guard 9. The noise detecting part 27b of the microphone 27 is surrounded by a substantially spherical wind-shielding member 27c, which is preferably formed of a spongy material, for reducing the influence of the wind on the noise detecting part 27b and thereby achieving accurate noise detection. The noise detecting part 27b and the wind-shielding member 27c are disposed within the cavity 9c of the water guard 9 so that their top and sides are covered by the water guard 9. A microphone cord 27d extends to the outside through the hole 13 formed in the vibration detector support 5. A directional microphone may be used instead of the non-directional microphone 27, if desired.

In the configuration as shown above, a noise can reach the noise detecting part 27b through a gap between the water guard 9 and the tubular member 20 of the noise detector support 7, while a rain drop can hardly reach the noise detecting part 27b. Therefore, the probability of malfunction of the microphone 27 or other electric components is effectively reduced, achieving a substantially maintenance-free system. The detecting unit 1 can be placed at various locations including outdoors without the need for any additional part serving as a shelter.

[DISPLAY UNIT]

Figure 6:
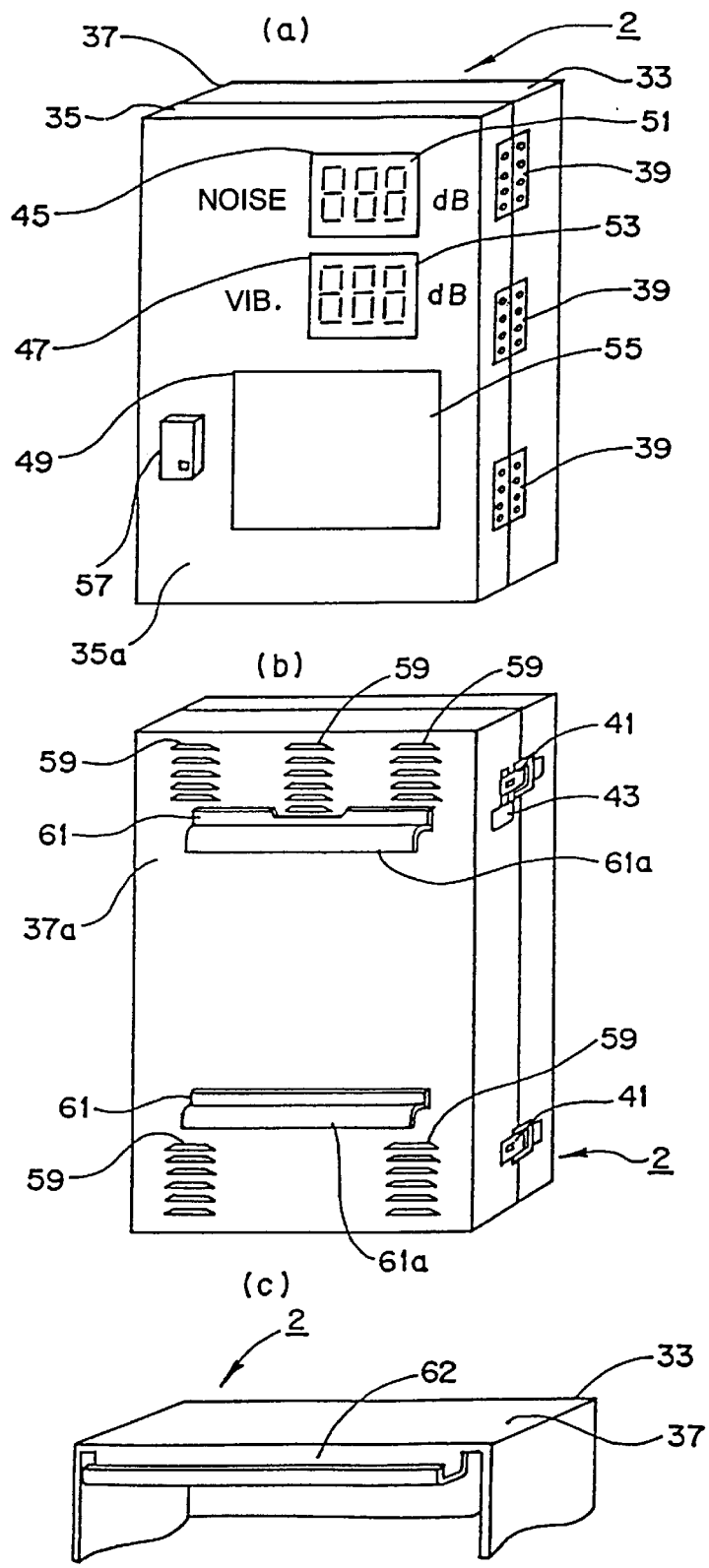
FIGS. 6(a) and (b) are a front perspective view and a rear perspective view, respectively, of the display unit shown in FIG. 1, and FIG. 6 (c) is a partial view for schematically showing a trough portion provided to the rear part of the display unit.

FIG. 6 shows an embodiment of the display unit 2 in the noise/vibration measuring and disclosing system according to the present invention shown in FIG. 1. This display unit 2 is used to effectively disclose the information to the local residents so as to establish a favorable relationship between the construction company and the local residents. To achieve this end, the display unit 2 is adapted such that it can be installed at various locations such as on the wall surrounding the construction site, can display the measured values of noise and vibration and other information or messages, and can be used in a direct conversational communication between a company's personnel and a local resident.

FIG. 6(a) is a front perspective view and FIG. 6(b) is a rear perspective view of the display unit 2. The display unit 2 comprises a stainless steel housing 33 which consists of a front part 35 serving as a front cover and a rear part 37. The front part 35 and the rear part 37 are connected to each other by three hinges 39 so that the front part 35 can be opened and closed. On the side opposite to that on which the hinges 39 are provided, engaging members 41 are provided to hold the front and rear parts 35 and 37 in the state that the front part 35 is closed. A lock 43 may be used to prevent unauthorized opening of the front part 35.

Three rectangular windows 45, 47 and 49 are formed on a front surface 35a of the display unit 2.

Inside the window 45 is mounted a noise display panel 51 comprising three seven-segment LED sets to display a measured value of noise together with a circuit board to control the LEDs. In the same fashion, a vibration display panel 53 is mounted inside the window 47 for displaying a measured value of vibration. These windows are preferably covered with acrylic plastic plates or the like which can pass the light emitted from the LEDs. The value of noise/vibration displayed on the windows can be flashed under the control of the control unit 3, which will be described in detail later, when the measured noise/vibration exceeds a predetermined reference value.

Inside the lowermost window 49 which is larger than the windows 45, 47 is mounted an image display panel 55 for serving as image display means together with its control circuit board. The image display panel 55 is also covered with a transparent acrylic plastic plate. The image display panel 55 consists of LEDs which emit light under the control of the control unit 3 so as to display various images. The images can comprise character information that is not only static but may be scrolled, or can comprise static or moving pictures such as a symbolized workman icon repeating a bowing motion. Of course it is possible to combine the character information and pictures. Such a way of displaying information can allow various information or messages to be given to the local residents in an easily recognizable and friendly fashion, and thus help to bring about an understanding of the local residents for the construction.

On the front surface 35a of the unit 2 is mounted an intercom sub-station 57 serving as communication means. The cable from the sub-station 57 is routed into the interior of the display unit 2 through a hole formed in the front surface 35a, and thus, the intercom sub-station 57 can be easily installed to the display unit 2, and can be easily replaced when it malfunctions. By connecting the intercom sub-station 57 to the intercom master-station placed in the construction site, a local resident can converse with a company's personnel by using the intercom sub-station 57, and the company can promptly respond to the inquiries or complaints from the local residents. This can help to establish a favorable relationship between the company and the local residents.

On a rear surface 37a of the display unit 2 are provided a plurality of heat dissipating holes 59 opened in a generally downward direction. The heat dissipating holes 59 are preferably covered with nets or the like for preventing dust from entering the unit 2.

Two laterally extending engagement members 61 are secured on upper and lower portions of the rear surface 37a. Each of these engagement members 61 is bent in a downward direction to form an engagement part 61a.

As shown in FIG. 6(c), the rear part 37 of the housing 33 comprises a trough portion 62 on the side facing the front part 35. The trough portion 62 is positioned under the interface between the front and rear parts 35 and 37 when the front part 35 is closed, and prevents rainwater or the like from entering the housing 33 through the interface so that the rainwater will not reach a print circuit board or the like inside the housing 33. The rainwater received by the trough portion 62 flows to either side of the trough portion 62 and is discharged from there to the outside of the housing 33.

The control circuit boards for the display panels, power supply units, etc. are contained inside the rear part 37. One or more ROMs for pre-storing the images to be displayed on the display panels are mounted on the control circuit boards. The ROMs can pre-store various pictures as well as character information such as the company name, construction site address, construction site manager's name, messages, etc., depending on particular conditions of each construction site. It is of course possible to add further ROMs or to replace some of the ROMs so as to add or change the images to be displayed. Alternatively or additionally it is possible to is mount ROMs in the control unit 3.

Figure 7:
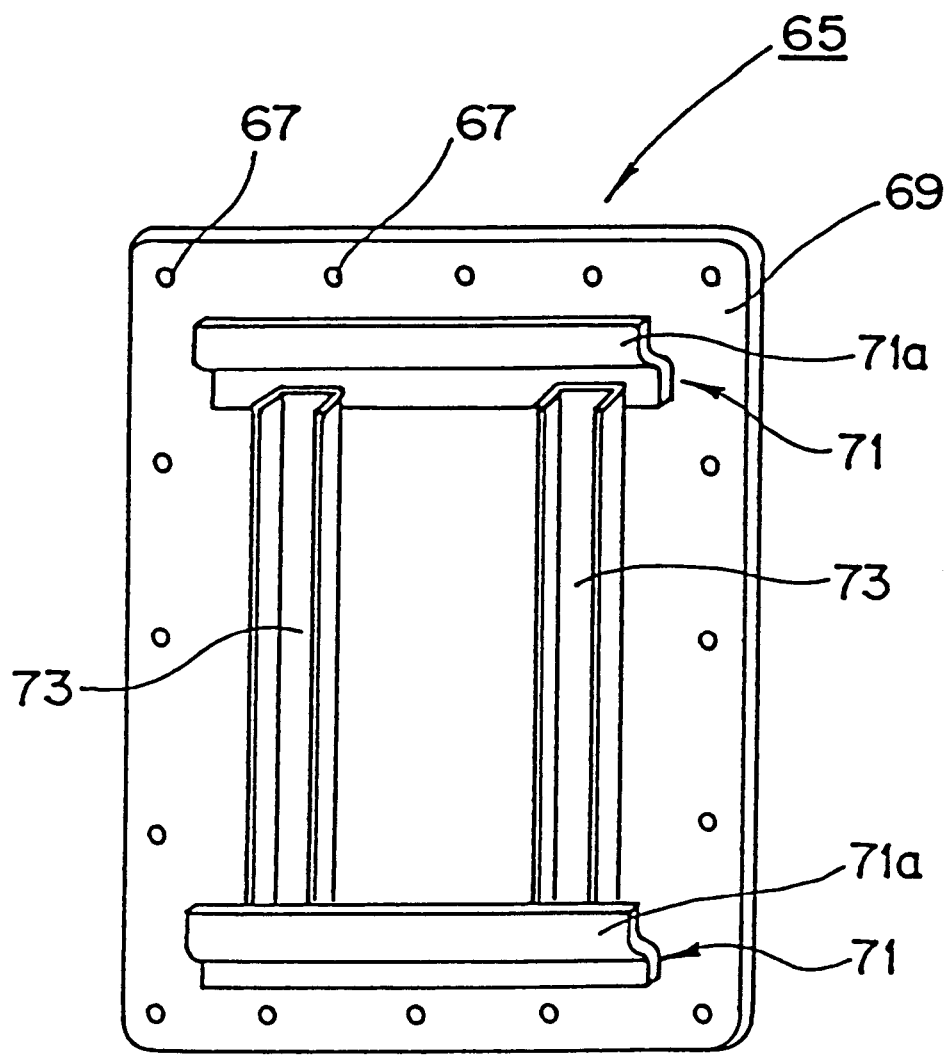
FIG. 7 shows a member for securing the display unit shown in FIG. 6 on the wall.

FIG. 7 shows a hooking member 65 for engaging the display unit 2 on the wall.

This hooking member 65 comprises a rectangular plate 69 having a plurality of holes 67 in its marginal portion for securing the hooking member 65 on the wall by means of screws or the like. Two laterally extending engagement members 71 are provided on upper and lower portions of a front surface of the plate 69 correspondingly to the aforementioned engagement members 61 provided on the rear side of the display unit 2. The engagement members 71 have engagement parts 71a which are bent in an upward direction so as to engage with the engagement parts 61a of the engagement members 61. Two reinforcing members 73, 73 having a generally U-shaped cross section and laterally spaced from each other extend from the upper engagement member 71 to the lower engagement member 71 to increase the mechanical strength of the hooking member 65.

By securing the hooking member 65 by means of screws or the like to such a place that is easily accessible or visible by the local residents (for example, on the wall surrounding the construction site), and by engaging the engagement parts 61a, 61a provided on the rear side of the display unit 2 with the engagement parts 71a, 71a of the hooking member 65, the display unit 2 can be easily installed. In this way, the display unit 2 takes a minimal space for its installation.

The installation of the display unit 2 allows real-time and continuous disclosure of the measured noise and vibration to the local residents, to thereby contribute to publicize the company's activities for suppressing the noise and vibration generated at the construction site. The local residents are allowed to check the noise and vibration at any time and communicate with a company's personnel by using the intercom sub-station 57 then and there when they find any abnormality.

The present system may comprise a plurality of display units 2 connected to the control unit 3. By placing the plurality of display units 2 at various locations, easier access to the measured noise and vibration by the local residents can be achieved and more local residents are allowed to check the noise and vibration, and therefore, more effective disclosure of the information can be achieved.

[CONTROL UNIT]

FIG. 8 shows one embodiment of the control unit 3 in the noise/vibration measuring and disclosing system according to the present invention shown in FIG. 1. The control unit 3 controls the detecting unit 1 and the display unit 2 described above.

FIG. 8(a)–(c) are a front perspective view, a rear perspective view and a bottom view, respectively, of the control unit 3. The control unit 3 comprises a front part 77 and a rear part 79 which are connected to each other by two hinges 75, 75 such that the front part 77 can be opened and closed. On the side opposite to that on which the hinges 75 are provided, an engaging member 81 is provided to hold the front and rear parts 77 and 79 in the state that the front part 77 is closed.

A rectangular window 83 is formed in an upper portion of a front surface 77a of the control unit 3. Inside the window 83 is mounted a panel 89 consisting of a display block 85 and a keypad 87. The panel 89 is secured to an inside of the front part 77 by means of bolts or the like together with a circuit board therefor.

The display block 85 comprises three LED panels: a second noise display panel 91 serving as second noise display means; a second vibration display panel 93 serving as second vibration display means; and a displayed image verification panel 95 for verifying the image displayed on the display unit 2 by showing the image's identification code which can consist of numerals and characters. In this embodiment, each of the panels 91, 93 and 95 consists of three seven-segment LED sets.

The keypad 87 comprises substantially square 16 numerical and function keys 97. This keypad 87 serves as reference value setting means, image selection means, and monitoring mode selection means.

At a left-hand lower portion of the front part 77a is formed a sheet output hole 99 for outputting sheets of paper or other material on which measured values or other information are printed. A printer (not shown in the drawings) is fixed inside the control unit 3 behind the sheet output hole 99 preferably together with a roll of paper and a paper feeder. By using the printer, the measured data can be recorded in printed form and therefore a report of the noise and vibration or the like can be prepared easily and quickly.

On a right-hand lower portion of the front part 77a are provided an alarm lamp 101, an alarm buzzer 103, a switch 105 for activating and inactivating the alarm lamp and buzzer 101 and 103, a power switch 107, an LED 109 for indicating a power-on state, and an LED 111 which is turned on while measurement is conducted. An upwardly protruding attachment member 113 having an attachment hole 113a is provided on the top 79a of the rear part 79.

A hole 82 is formed in a lower portion of a right side 79b of the rear part 79 so that the cables such as those used for connection with the detecting unit 1 and the display unit 2 can be drawn out from inside the control unit 3 when the control unit 3 is placed directly on the base or the floor.

In a bottom 79c of the rear part 79 is formed a hole 114 which can be used to draw out the cables for connection with the detecting unit 1 and the display unit 2 when the control unit 3 is hung on the wall. Further, two substantially rectangular holes 115, 115 are formed to attach the control unit 3 to a back plate 117 which serves as a hooking member as will be described later.

Inside the rear part 79 are accommodated a CPU, memory devices, a power supply, a control block for microphone 27 and the vibration detector 6 of the detecting unit 1, etc. The electric power for the detecting unit 1 and the display unit 2 is supplied from the power supply of the control unit 3 through the cables connecting therebetween.

Figure 9:
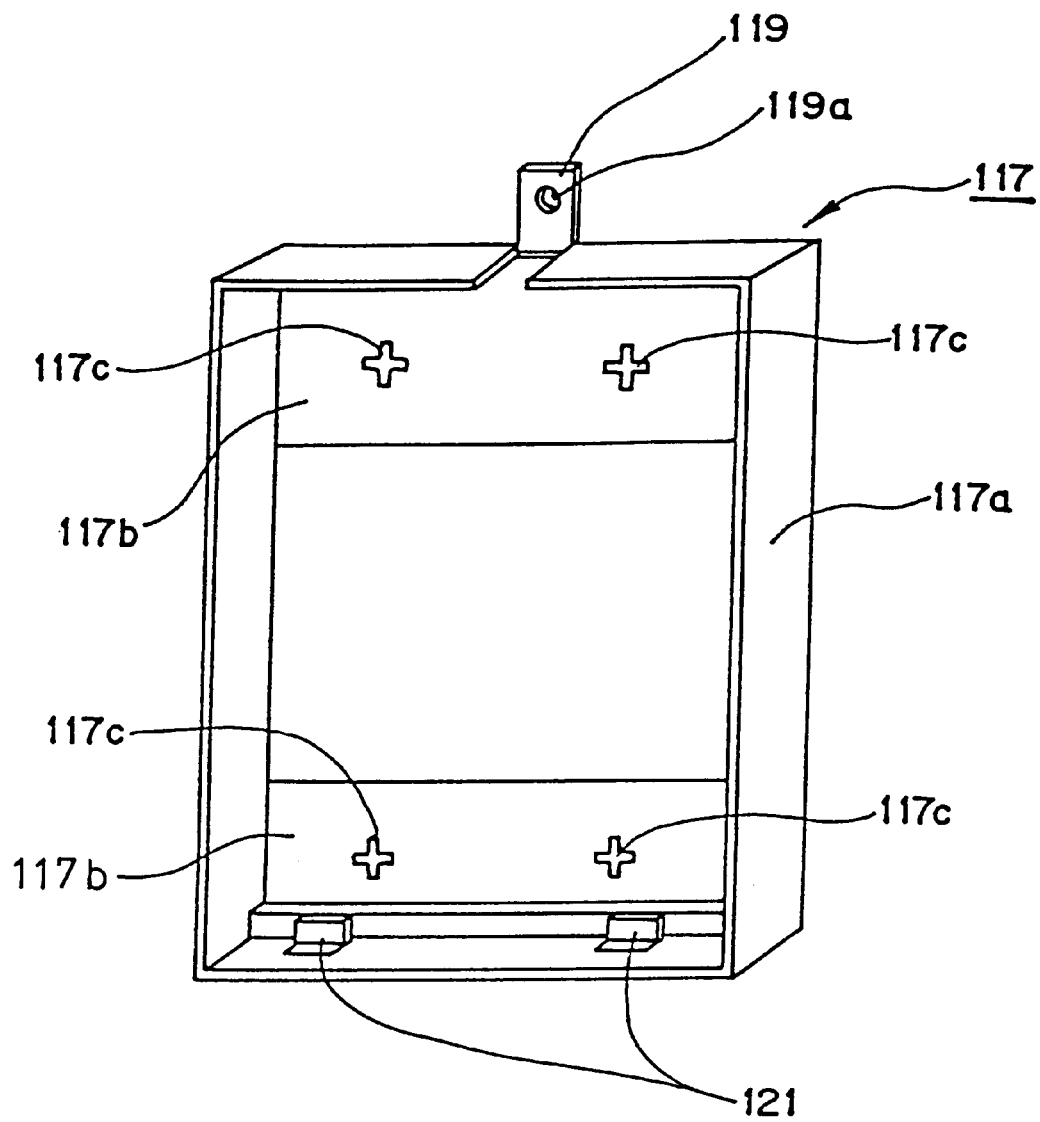
FIG. 9 shows a back plate for securing the control unit shown in FIG. 8 on the wall.

FIG. 9 shows the back plate 117 used for hanging the control unit 3 on the wall of the construction site office or the like. The back plate 117 comprises a frame portion 117a for supporting the outer periphery of the control unit 3 and a backing portion 117b. At a central portion of the top of the frame portion 117 is provided an attachment member 119 having a hole 119a. Two protrusions 121, 121 are formed on left and right portions of an upper surface of the bottom of the frame portion 117a. To hang the control unit 3 on the wall, the back plate 117 is first secured to the wall by means of screws or the like which are passed through the holes 117c provided in the backing portion 117b. Subsequently the rectangular holes 115, 115 formed in the bottom of the control unit 3 are fitted on the protrusions 121, 121 of the back plate 117, and the hole 119a of the attachment member 119 of the control unit3 is aligned with the hole 113a of the attachment member 113 of the back plate 117. Then, a screw or bolt is passed through the aligned holes 119a and 113a and engaged to the wall. In this way, the control unit 3 can be easily secured on the wall. The control unit 3 may be placed on a base or a table without using the back plate 117, although it is preferable to hang the control unit 3 on the wall in view of the space required for installation.

The installation of the control unit 3 in the construction site office or the like makes it possible to monitor the noise and vibration as well as to record the measured values thereof in the office.

The noise/vibration measuring and disclosing system according to the present invention can be implemented by connecting the detecting unit and display unit to the control unit by using cables.

[FUNCTIONS OF THE SYSTEM]

In the following are described various functions of the present invention system.

Figure 10:
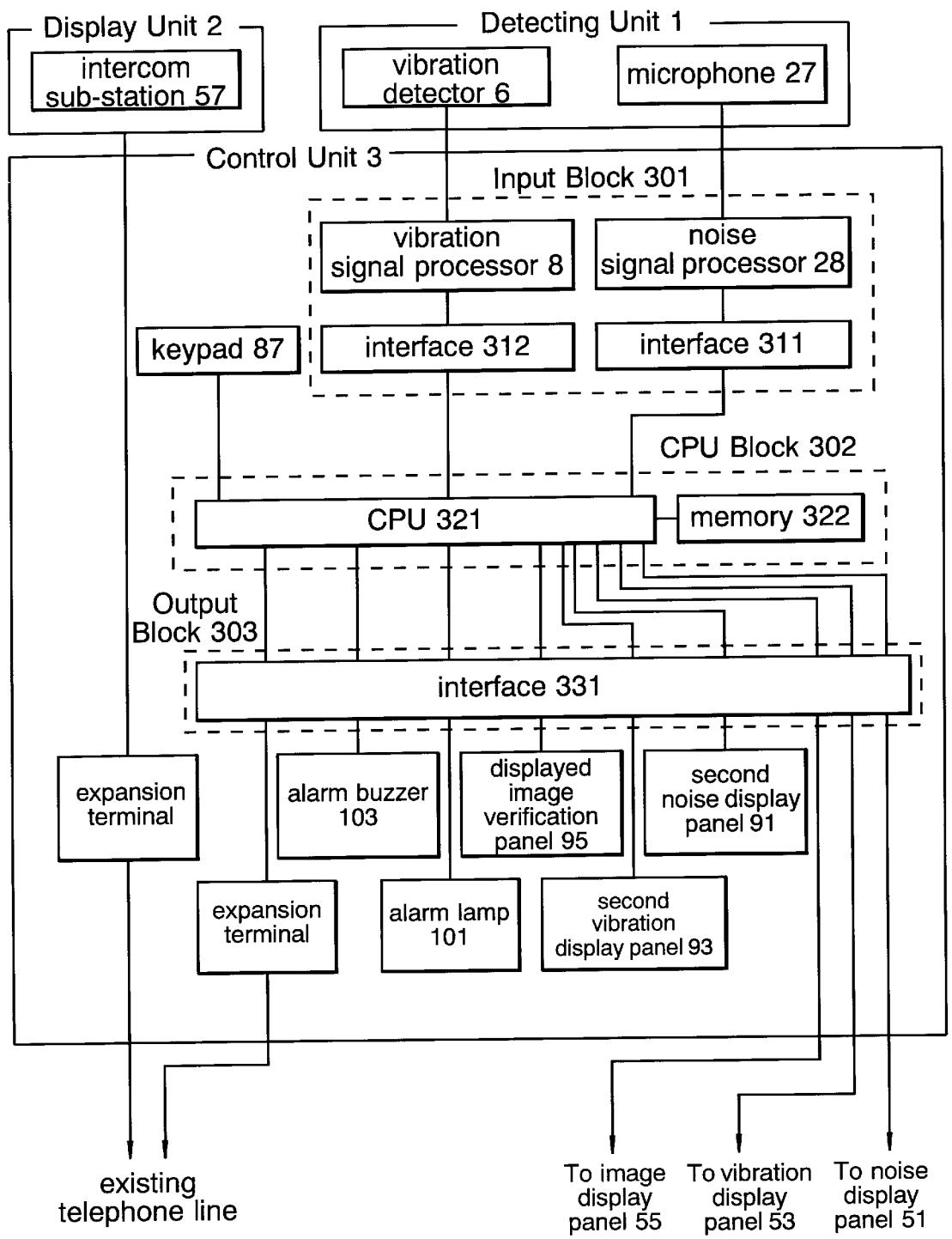
FIG. 10 is a block diagram for showing a general configuration of the control unit of the system according to the first embodiment of the present invention.

As shown in FIG. 10, the control means of the control unit 3 comprises an input block 301, a CPU block 302 and an output block 303.

The input block 301 receives signals from the microphone 27 and the vibration detector 6.

The CPU block 302 comprises a CPU 321 which operates according to the programs or software stored in a ROM in a memory block 322 so as to control the whole system.

The output block 303 comprises an interface 331 through which measured values of noise and vibration are forwarded to the LED panels of the display unit 2 and of the control unit 3 as well as to the printer, and alarm signals are output to turn on the alarm lamp 101 and/or to emit sound from the alarm buzzer 103 when a measured value of noise/vibration exceeds a reference value.

The microphone 27 converts a noise into an electric signal which is transmitted to the input block 301 of the control unit 3 via the cable connecting the detecting unit 1 and the control unit 3 to each other. In the present embodiment, the detecting means (microphone) 27 mounted in the detecting unit 1 is connected via the cable to a noise signal processor 28 which constitutes the input block 301. The noise signal processor 28 converts the electric signal from the microphone 27 into measured data.

The measurement of vibration is performed in a similar manner. The vibration detector 6 coverts a vibration into an electric signal which is forwarded into the input block 301 of the control unit 3. The input electric signal is converted into measured data by a vibration signal processor 8 in the input block 301.

The noise signal processor 28 and the vibration signal processor 8 are connected to the CPU block 302 via interfaces 311 and 312, respectively, and controlled by the CPU 321. In this embodiment, the control is conducted according to the following settings which should be predetermined before the operation of the system:

(1) A measuring interval or the interval of read-out of the measured data of noise and vibration from the noise signal processor 28 and the vibration signal processor 8;

(2) A calculation mode (average, maximum, or minimum) which is carried out in the conversion of a signal into measured data (The signal conversion is carried out in the noise signal processor 28 and in the vibration signal processor 8.);

(3) A data calculation and update interval or the interval of the calculation to obtain the measured data (This interval may be set corresponding to the selected calculation mode.);

(4) A data storing interval or the interval of storing the measured data into the memory 322 in the CPU block 302;

(5) A data recording starting time or the time when the recording of the measured data is automatically started;

(6) A data recording stopping time or the time when the recording of the measured data is automatically stopped (The data recording starting and stopping times define an automatic monitoring mode);

(7) A noise reference value for producing an alarm when a measured noise from the noise signal processor 28 exceeds the reference value (The comparison of the measured noise and the reference value is carried out by measured noise data comparison means which can be implemented by the CPU 321 and the memory 322. The alarm buzzer 103 for emitting sound and the alarm lamp 101 for flashing light can serve as noise alarming means. The alarm buzzer 103 and the alarm lamp 101 are connected to the switch 105 and are inactivated when the switch 105 is turned off); and (8) A vibration reference value for producing an alarm when a measured vibration from the vibration signal processor 8 exceeds the reference value (The comparison of the measured vibration and the reference value is carried out by measured vibration data comparison means which can be implemented by the CPU 321 and the memory 322. In this embodiment, the alarm buzzer 103 and the alarm lamp 101 serve as both the noise alarming means and vibration alarming means, and therefore, an alarm is produced when either noise or vibration exceeds the corresponding reference value. It is of course possible to provide an alarming buzzer and lamp for noise separately from those for vibration.).

In the devices connected to the CPU block 302 through the interface 331 of the output block 303 are included the second noise and vibration display panels 91 and 93, the displayed image verification panel 95, the alarm lamp 101, the alarm buzzer 103 and the printer which are provided to the control unit 3, as well as the noise display panel 51, the vibration display panel 53 and the image display panel 55 which are provided to the display unit 2. The control unit 3 can be provided with one or more expansion terminals which are also connected to the CPU 321 via the interface 331.

In this embodiment, the control of the output devices connected to the output block 303 is conducted according to the following settings which should be predetermined before the operation of the system:

(1) A data output interval (the interval of transmitting the measured data to the LED panels of the control unit 3 and the display unit 2);

(2) Data printing times (the times when the measured data stored in the memory 322 is automatically printed by the printer);

(3) Image display patterns which are to be displayed on the image display panel 55 of the display unit 2 (Each image display pattern can be determined by selecting a set of images and then determining the order of the images to be displayed.); and (4) Image display modes (Each image display mode can be set by selecting an image display pattern and determining the timing or time when the selected image display pattern is to be displayed. The image display modes can be set such that different image display patterns are displayed depending on the day of the week, for example.)

The settings described above can be achieved by using the keypad 87 mounted to the control unit 3. The adjustment of the date and time of the built-in timer is also possible by using the keypad 87.

The following functions in addition to those described above can also be performed by using the keypad 87:

(1) to initialize the settings;

(2) to print the current settings;

(3) to start and stop recording of the measured data upon request (Such recording of the measured data upon request is conveniently carried out when the automatic monitoring mode is not selected. While the recording of the measured data is conducted, the LED 111 is turned on.);

(4) to display the number of measured data stored in the memory 322 on the displayed image verification panel 95 or to print the same with the printer;

(5) to display the time or other information of the built-in timer on the image display panel 55 of the display unit 2 or on the displayed image verification panel 95 of the control unit 3;

(6) to print the daily record on a particular day with the printer or to print any part of the data upon request;

(7) to delete measured data of noise and vibration stored in the memory 322;

(8) to display the state of communication between the control unit 3 and the display unit 2 on the displayed image verification panel 95 of the control unit 3; and (9) to display a suitable error message on the displayed image verification panel 95 of the control unit 3 in the following cases:

a) paper empty . . . the case where no paper is set in the printer;

b) printer error . . . the case where an abnormality such as paper jam exists in the printer state;

c) noise detector error . . . the case where an abnormality exists in the state of communication between the noise signal processor 28 and the CPU block 302;

d) vibration detector error . . . the case where an abnormality exists in the state of communication between the vibration signal processor 8 and the CPU block 302;

e) memory overflow error . . . the case where the memory is full and cannot store additional data;

f) transmission error . . . the case where the data transmission to the display unit 2 cannot complete normally.

Error messages other than those listed above may be displayed.

In the shown embodiment, the control unit 3 is not provided with an intercom master-station. Instead, the cable from the intercom sub-station 57 is connected to an existing telephone line of the construction site via an expansion terminal provided to the control unit 3. In this way, any extension connected to the existing telephone line can be used in responding to the incoming call from the intercom sub-station 57. Additionally or alternatively, by using a portable wireless handset, a personnel who is carrying the wireless handset can answer the call from the intercom sub-station 57 at anytime even when he is not near the control unit 3 nor the stationary extensions, resulting in wider activity area of the personnel. Of course, it is possible to provide the control unit 3 with an intercom master-station connected to the intercom sub-station 57 and install the control unit 3 in the construction site office or the like where someone is always present so as to be able to answer the incoming call from the sub-station 57. It may be also possible by using the CPU 321 to selectively transfer the incoming call from the sub-station 57 either to the master-station mounted to the control unit 3 or to the existing telephone line via the expansion terminal.

The alarm can be emitted not only from the buzzer 103 or lamp 101 mounted to the control unit 3 but also from an outside alarm unit such as a flashing red lamp when the outside alarm unit is connected to the CPU 321 via the expansion terminal. Alternatively or additionally, when the control unit 3 is connected to the telephone line of the construction site via the expansion terminal, an extension connected to the existing telephone line inside the construction site can be used to emit alarm. The control unit 3 can also be connected to the public telephone line outside the construction site, so that a beeper or the like can be used to contact a personnel outside the construction site when an alarm is generated. The CPU 321 may be connected to an outside communication network other than the telephone line. Such outside communication network may be a local area network or just a single personal computer.

Although the above embodiment was described as the one used in the construction site, the present invention is not limited to the use in the construction site and can be used in any place such as in a factory where noise/vibration is produced. Further, although the above embodiment was designed to measure and disclose both of noise and vibration, the system may be designed to measure and disclose only one of noise and vibration.

(SECOND EMBODIMENT)

It is sometimes required depending on a work to monitor parameters other than noise and vibration such as air pollution level, water pollution level or radioactivity level which may influence the environmental conditions.

In such cases, the detecting unit may comprise a detector for detecting such parameters so that they can be displayed on the display panels together with other information concerning the work. For example, the detector may detect the level of nitrogen oxides which can indicate the level of air pollution.

In this embodiment also, the display unit may comprise one terminal of communication means (intercom system) which is connected to the other terminal mounted to the control unit which can be placed inside the factory or the like. This enables the local residents to directly communicate with a company's personnel so that the company can quickly respond to the inquiry or complaint from the local residents.

(THIRD EMBODIMENT)

In the first embodiment, the expansion terminal was used only for the transfer of the alarm signal and for the expansion of the intercom communication line. However, by allowing signals to be input from the outside communication network such as an existing telephone line to the CPU block via the expansion terminal, it is possible to control the system according to the instructions provided via the outside communication network.

(FOURTH EMBODIMENT)

In the first embodiment, the display unit was provided with an intercom sub-station. The display unit may be additionally provided with input means such as a keypad which is connected to the CPU block of the control unit, to thereby allow the local residents to select the image displayed on the display unit by operating the input means.

(FIFTH EMBODIMENT)

In the above embodiments, the detecting unit 1, the display unit 2 and the control unit 3 were separate from each other so that the noise and vibration detected inside the construction site can be effectively disclosed to the local residents outside the construction site. However, in some cases such as when the measurement of noise and vibration is carried out in a residential area outside the premises of the construction site or when the system is used on a road which is under construction for cable laying or the like, the location where the measurement is carried out is the same as or very close to the location where the measured data should be displayed. In such cases, it is convenient that the detecting unit, display unit and the control unit can be integrally attached to each other.

Such an embodiment is shown in FIG. 11. FIGS. 11(A) and (B) are a front perspective view and a rear perspective view, respectively, of a base unit 4 for combining the detecting unit 1, the display unit 2 and the control unit 3. As shown in the drawings, the base unit 4 comprises a generally parallelepiped base portion 141. The base portion 141 is adapted to steadily hold the detecting unit 1 thereon. In the shown embodiment, the base unit 141 is provided on its upper side with a cavity 142 for receiving the detecting unit 1. In another embodiment, a frame may be fixed on the upper surface of the base portion 141 to receive the detecting unit 1. The base portion 141 preferably consists of a hollow member to reduce the weight and facilitate the transport of the system. When the system is in use, the base portion 141 is filled with water or the like through an inlet 143 so as to stabilize the system. The water filling the base portion 141 can be discharged through an outlet provided underside the base portion 141 (the outlet not shown in the drawings) when the system is required to be transported to another place. On the upper side of the base portion 141 is also provided a frame member 145 for supporting the display unit 2. In this embodiment, the frame member 145 is formed on its front side with four holes 146 for securing the rear part 37 of the display unit 2 to the frame member 145 by means of screws or the like. Further, a container 148 for accommodating the control unit 3 therein is attached to the rear side of the frame member 145 via a plate 147 by welding or other suitable means. The container 148 is water-proofed so as to protect the control unit 3 from rain when the system is used outdoors. Preferably, the container 148 has a room for storing the printouts from the printer of the control unit 3. Although not shown in the drawings, the container 148 is provided with a hole for drawing out the cables connected to the control unit 3.

FIG. 11(C) shows the noise and vibration measuring and disclosing system with the detecting unit 1, the display unit 2 and the control unit 3 all integrally attached to the base unit 4. It should be noted that cables for connecting the units are omitted in the drawing. After transported to the measuring location, the detecting unit 1 is detached from the base unit 4 and placed on the ground for operation. The base unit 4 may be preferably equipped with wheels or casters 144 as shown in the drawings so as to allow easy adjustment of the position and/or orientation of the system. Thus, in this embodiment, the system can be easily carried to various locations and disclose the measured data then and there.

Although the present invention has been described in terms of preferred embodiments thereof, it is obvious to a person skilled in the art that various alterations and modifications are possible without departing from the scope of the present invention which is set forth in the appended claims. For example, the detecting unit 1 and the display unit 2 can be connected to the control unit 3 by wireless instead of the cables as shown in FIG. 1, although in such an embodiment it is necessary for each of the detecting and display units to be provided with their own power supplies. Further, the LED panels of the display unit or the control unit can be replaced by a CRT, a plasma display or other suitable display device.

What we claim is:

1. A noise/vibration measuring and disclosing system, comprising:

means incorporated in a detecting unit for detecting noise/vibration;

means incorporated in a display unit for displaying a measured value of noise/vibration detected by the noise/vibration detecting means; and means incorporated in a control unit for controlling the detecting means and the display means, the three units being separate from each other, and the display unit being placed at a position easily visible by local residents so that the measured value of the noise/vibration can be effectively disclosed to the local residents.

2. A noise/vibration measuring and disclosing system according to claim 1, further comprising a base unit for combining the detecting unit, the display unit and the control unit.

3. A noise/vibration measuring and disclosing system according to claim 2, wherein the base unit comprises:

a base unit comprising a hollow member adapted for steadily holding the control unit thereon; and a supporting portion provided on the base portion for supporting the control unit and the display unit;

wherein the hollow base portion is adapted such that liquid material can be filled into and discharged from the base portion to change a weight of the base unit.

4. A noise/vibration measuring and disclosing system according to claim 3, wherein the supporting portion comprises a container for accommodating the control unit.

5. A noise/vibration measuring and disclosing system according to claim 1, wherein the control unit is provided with:

means for comparing a measured value of noise/vibration with the predetermined noise/vibration reference value so as to generate an alarm signal when the measured value of noise/vibration exceeds the reference value;

a first alarming means for emitting an alarm in response to the alarm signal generated by the comparison means; and reference value setting means for setting the noise/vibration reference value.

6. A noise/vibration measuring and disclosing system according to claim 1, wherein the display unit further comprises image display means for displaying an image, and the control unit further comprises image selection means for selecting the image displayed on the image display means.

7. A noise/vibration measuring and disclosing system according to claim 5, wherein the display unit further comprises image display means for displaying a predetermined image, and the control unit further comprises image selection means for selecting the image to be displayed on the image display means.

8. A noise/vibration measuring and disclosing system according to claim 7, wherein the control unit further comprises:

second noise/vibration display means for displaying the measured value of noise/vibration; and displayed image verification means for verifying the image displayed on the image display means.

9. A noise/vibration measuring and disclosing system according to claim 8, wherein the control unit further comprises monitoring mode switching means for switching a monitoring mode of the system between a first monitoring mode in which the monitoring of noise/vibration starts and stops automatically and a second monitoring mode in which the monitoring of noise and vibration starts and stops upon request.

10. A noise/vibration measuring and disclosing system according to claim 1, wherein the display unit and the control unit are connected to each other by communication means for allowing communication between a person at the display unit and a person at the control unit.

11. A noise/vibration measuring and disclosing system according to claim 10, wherein the communication means is an intercom system and the display unit is provided with an intercom sub-station and the control unit is provided with an intercom master-station.

12. A noise/vibration measuring and disclosing system according to claim 1, wherein the control unit is provided with an expansion terminal for connection with an existing telephone line and the display unit is provided with an intercom sub-station which is connected to the existing telephone line via the expansion terminal of the control unit.

13. A noise/vibration measuring and disclosing system according to claim 1, wherein the display unit is provided with an intercom sub-station, and the control unit is provided with an intercom master-station and an expansion terminal for connection with an existing telephone line, and wherein the intercom sub-station is selectively connected under the control of the control means to either of the intercom master-station or the existing telephone line via the expansion terminal.

14. A noise/vibration measuring and disclosing system according to claim 1, the control unit is provided with an expansion terminal for connection with an outside communication network.

15. A noise/vibration measuring and disclosing system according to claim 5, wherein the control unit is provided with an expansion terminal for transferring the alarm signal generated by the comparison means to a second alarming means external to the control unit for emitting an alarm in response to the alarm signal.

16. A noise/vibration measuring and disclosing system according to claim 1, wherein the system comprises a plurality of said display unit which are controlled by the control unit.

17. A noise/vibration measuring and disclosing system according to claim 1, wherein the detecting unit comprises:

a vibration detecting support which is adapted for being placed on a ground at which the measurement of vibration is performed, the vibration detecting support comprising a hollow parallelepiped having a substantially square top and bottom, wherein the vibration detecting means is secured on an upper surface of the bottom of the vibration detecting means support in such a manner that a vibration detecting part having a rounded end extends through the bottom of the vibration detecting means support and projects from an under surface of the bottom of the support, and wherein support legs each of which has a rounded end and has substantially the same height as the end portion of the vibration detecting part are provided on the under surface of the bottom of the support;

a noise detecting means support comprising: a substantially cylindrical member standing upright on a central portion of the top of the vibration detecting means support so that an inner space of the substantially cylindrical member is connected to an inner space of the hollow vibration detecting means support via an opening formed at the central portion of the top of the vibration detecting means support; a noise detecting means mount fixed at a top portion of the substantially cylindrical member for securing a non-directional microphone serving as the noise detecting means in such a manner that a noise detecting part of the microphone is positioned above an upper end of the substantially cylindrical member; and a substantially spherical wind-shielding member for covering the noise detecting part of the microphone; and a water guard member having a top wall and a diverging cylindrical side wall which extends from the top wall, inner surface of the side wall of the water guard attached to an upper part of the noise detecting means mount via a water guard member supporting arm extending therebetween so that the noise detecting part and the wind-shielding member are covered by the water guard member.

18. A noise/vibration measuring and disclosing system according to claim 6, wherein the display unit is provided on its front surface with:

a noise display panel comprising LEDs for displaying a measured value of noise;

a vibration display panel comprising LEDs for displaying a measured value of vibration;

an image display panel comprising LEDs for displaying the image selected by the image selection means of the control unit;

and wherein the display unit is provided on its rear surface with an engagement part for engaging the display unit to an engagement member fixed on a wall.

19. A noise/vibration measuring and disclosing system according to claim 9, wherein the control unit further comprises a printer for printing the measured value of noise/vibration.

20. A noise/vibration measuring and disclosing system according to claim 19, wherein the control unit is provided on its front surface with:

a displayed image verification panel comprising LEDs for displaying a code corresponding to the image displayed on the image display means, the displayed image verification panel serving as the displayed image verification means;

a second noise display panel comprising LEDs for displaying a measured value of noise;

a second vibration display panel comprising LEDs for displaying a measured value of vibration;

an alarm buzzer and an alarm lamp serving as the alarming means; and a keypad serving as the reference value set means, the image switching means and the monitoring mode selection means;

and wherein the control means, the comparison means and the printer are mounted inside the control unit, and the control unit is further provided on its rear surface with an engagement part for engaging the control unit with an engagement member fixed on a wall.

21. A noise/vibration measuring and disclosing system, comprising:

means for detecting noise/vibration generated from a work site;

means for displaying a measured value of noise/vibration detected by the noise/vibration detecting means; and means for controlling the detecting means and the display means;

wherein the noise/vibration display means is placed at a location visible from outside the premises of the work site so that the measured value of noise/vibration can be effectively disclosed to local residents.

22. A data measuring and disclosing system, comprising:

a detecting unit for detecting a parameter used in evaluating an influence of a work on an environmental condition;

a display unit for displaying information regarding the work, the information including a measured value of the parameter; and, a control unit for controlling the detecting unit and the display unit;

wherein the detecting unit, the display unit and the control unit are separate from each other, and wherein the display unit is placed at a position easily visible to local residents outside of the work site so that the measured value of the parameter can be effectively disclosed to the local residents.

* * * * *